May 31, 1955      G. MAFERA      2,709,571
ALIGNER
Filed Sept. 12, 1952
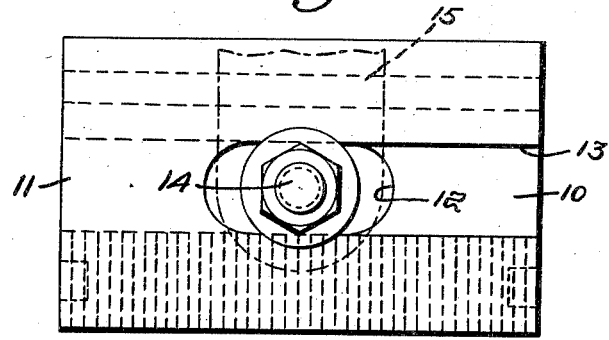
*Fig. 1.*
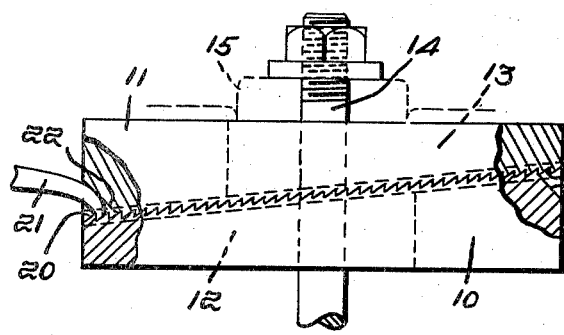 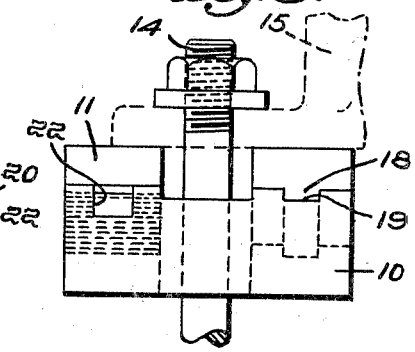
*Fig. 2.*      *Fig. 3.*
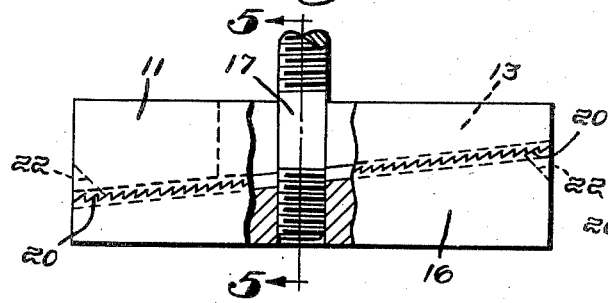 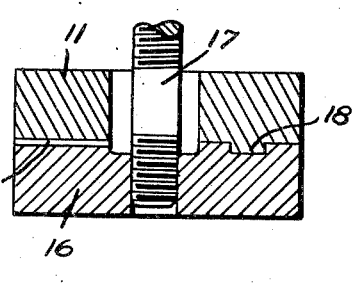
*Fig. 4.*      *Fig. 5.*
Inventor:
Guy Mafera,
by Abbot Spier
Attorney

United States Patent Office 2,709,571
Patented May 31, 1955

2,709,571

ALIGNER

Guy Mafera, Revere, Mass.

Application September 12, 1952, Serial No. 309,194

2 Claims. (Cl. 254—104)

This invention relates to aligners for use in supporting heavy objects in desired position relative to the surfaces on which they rest.

Many machines, for example, must be set up level or have their shafts accurately aligned with shafts to be connected thereto. In many instances, such equipment is sufficiently heavy so that it does not need to be anchored to the floor but in all instances, the use of adjustable aligning devices is advantageous because of the ease and accuracy with which positive adjustments may be effected.

Satisfactory aligning devices are illustrated by my patents numbered 2,123,484, issued July 12, 1938, 2,147,909, issued February 21, 1939, 2,170,690, issued August 22, 1939, and 2,248,715 issued July 8, 1941.

In each of these, there is disclosed an aligner having first and second wedge members, the mutually engageable surfaces of which are inclined relative to the upper and lower surfaces of the unit established by the assembled members to maintain them in parallel as one member is moved along the other in either direction to vary the aligner height. In these aligners, height adjustments are effected by means of a connection consisting of a bolt having its head seated against one end of one member with a washer engaging the opposite end of the other member under the influence of a nut threaded on the bolt.

The principal objective of this invention is to provide means enabling the height of aligners of that general type to be increased more readily and to be maintained positively. To accomplish that objective, the mutually engageable faces of the members are provided with longitudinally disposed portions, each comprising a substantial number of teeth of considerable width interengaging to hold the members against movement in a height decreasing direction but disengaging when one member is pried relative to the other in a height increasing direction. This construction may also be used with advantage with connections of the type shown in the aforesaid patents.

Another objective of the invention is to provide an aligner having a minimum number of independent parts. This objective is attained, with or without the toothed portions, by having the bolt to which the machine leg, for example, is attached, carried directly by the lowermost wedge member.

In the drawings, there are shown illustrative embodiments of the invention from which these and other of its novel features and advantages will be readily apparent.

In the drawings:

Fig. 1 is a top plan view of an aligner in accordance with the invention.

Fig. 2 is a partly sectioned side view of the aligner.

Fig. 3 is an end view thereof.

Fig. 4 is a partly sectioned side view of another embodiment of the invention, and Fig. 5 is a section taken along the indicated lines 5—5 of Fig. 4.

With reference to the embodiment of the invention shown in Figs. 1–3, the aligner consists of a lower wedge member 10 and an upper member 11. As will be apparent from Fig. 2, the mutually engageable faces of the members 10 and 11 are inclined to maintain the upper surface of the member 11 and the bottom surface of the member 10 in parallel as one of these members is moved along the other in either direction to vary the height of the aligner.

The members 10 and 11 have centrally located slots 12 and 13, respectively, opening through their thinner ends. When the members are assembled for use, the slots 12 and 13 define an elongated aperture through which extends the bolt 14 anchored in the floor or other supporting structure so that both members may be moved relative thereto. The bolt 14 serves to anchor the indicated machine leg 15. In the embodiment of the invention shown in Figs. 4 and 5, the bottom member 16 carries a stud 17 enabling the aligners to be anchored to legs 15 when the machine or other object is sufficiently heavy so that it does not need to be secured to the floor. The embodiment of the invention shown in Figs. 4 and 5 may otherwise be identical to that shown in Figs. 1–3.

Each aligner member is provided with a pair of longitudinally disposed portions adapted to mate with correspondingly located complemental portions with which the other member is formed. These are located adjacent each side of each member.

One mating pair of portions is in the form of a tongue and groove connection with the tongue 18 being shown as formed on the upper member 11 to enter the groove 19 in the lower member 10.

The other mating pair of portions is in the form of a substantial number of relatively wide teeth 20 disposed to anchor the members against relative movement in a direction to decrease the height of the aligner but disengaging when one member is moved relative to the other in a height increasing direction. To enable the latter movements to be effected as by a curved pinch bar indicated at 21, the thicker end of each member is recessed at 22 to expose the teeth 20 of the other member adjacent that end.

From the foregoing, it will be appreciated that aligners in accordance with the invention are well adapted for ease and convenience in use in accurately positioning heavy objects relative to their supporting surfaces.

What I therefore claim and desire to secure by Letters Patent is:

1. An aligner for adjustably supporting a heavy object in desired position relative to the surface on which it rests, said aligner comprising first and second wedge members having top and bottom surfaces and mutually engageable surfaces inclined relative to said other surfaces to maintain said other surfaces parallel as one member is moved along the other in either direction to vary the aligner height, said mutually engageable surfaces including first and second longitudinally disposed portions, said first portions each comprising a plurality of teeth of substantial width extending from end to end of said inclined surfaces and interengaging to hold said members against movement in a height decreasing direction and disengaging when one of the members is moved in that direction relative to the other and said second portion being in the form of a tongue and groove, at least one of the members including a shoulder with reference to which teeth of the other member are exposed thereby to enable height increasing relative movement between the members to be effected with a pry bar.

2. An aligner for adjustably supporting a heavy object in desired position relative to the surface on which it rests, said aligner comprising first and second wedge members having top and bottom surfaces and mutually engageable surfaces inclined relative to said other surfaces to maintain said other surfaces parallel as one member is moved along the other in either direction to vary the aligner height, said mutually engageable surfaces including first and second longitudinally disposed portions, said first portions each comprising a plurality of teeth of substantial width extending from end to end of said inclined surfaces and interengaging to hold said members against movement in a height decreasing direction and disengaging when one of the members is moved in that direction relative to the other and said second portion being in the form of a tongue and groove, each member having in its thicker end a pry bar recess intersecting its teeth thereby to expose the teeth of the other member adjacent that end.

References Cited in the file of this patent

UNITED STATES PATENTS

| | | |
|---|---|---|
| 780,979 | Correll | Jan. 31, 1905 |
| 940,113 | Amundson | Nov. 16, 1909 |
| 1,556,584 | Breeden | Oct. 13, 1925 |
| 2,164,615 | Mafera | July 4, 1939 |
| 2,170,690 | Mafera | Aug. 22, 1939 |
| 2,248,715 | Mafera | July 8, 1941 |